(12) United States Patent
Tsushima et al.

(10) Patent No.: US 6,294,292 B1
(45) Date of Patent: Sep. 25, 2001

(54) SECONDARY POWER SOURCE

(75) Inventors: Manabu Tsushima; Takeshi Morimoto; Yong Che, all of Kanagawa (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/353,136

(22) Filed: Jul. 14, 1999

(30) Foreign Application Priority Data

Jul. 14, 1998 (JP) ................................... 10-199235
Apr. 20, 1999 (JP) ................................... 11-112768

(51) Int. Cl.$^7$ ............................. H01M 4/58; H01M 4/60; H01M 6/12
(52) U.S. Cl. ....................... 429/231.8; 429/162; 429/215; 429/231.95
(58) Field of Search ................... 429/231.95, 162, 429/127, 231.1, 231.2, 231.3, 231.5, 232, 215, 231.8

(56) References Cited

U.S. PATENT DOCUMENTS

| Re. 33,306 | * | 8/1990 | Hayashi et al. ....................... 429/194 |
| 4,737,424 | * | 4/1988 | Tobishima et al. ................... 429/197 |
| 5,256,504 | * | 10/1993 | Okuno et al. ......................... 429/197 |
| 5,451,477 | * | 9/1995 | Omaru et al. ......................... 429/218 |
| 5,484,669 | * | 1/1996 | Okuno et al. ......................... 429/194 |
| 5,580,684 | * | 12/1996 | Yokoyama et al. ................... 429/194 |
| 5,683,834 | * | 11/1997 | Fujimoto et al. ..................... 429/218 |
| 5,714,281 | * | 2/1998 | Naruse et al. ........................ 429/197 |
| 5,953,204 | * | 9/1999 | Suhara et al. ......................... 361/502 |
| 5,985,489 | * | 11/1999 | Ohsaki et al. ...................... 429/231.7 |
| 5,989,744 | * | 11/1999 | Yamaura ............................... 429/223 |
| 6,038,123 | * | 3/2000 | Shimodaira et al. ................. 361/502 |

\* cited by examiner

*Primary Examiner*—Tom Dunn
*Assistant Examiner*—Kiley Stoner
(74) *Attorney, Agent, or Firm*—Oblon, Spivak, McClelland, Maier & Neustadt, P.C.

(57) ABSTRACT

A secondary power source, which comprises a positive electrode containing activated carbon, a negative electrode containing a carbon material capable of doping and undoping lithium ions, and an organic electrolyte containing a lithium salt, wherein the ratio of the positive electrode capacity ($C^+$) to the negative electrode capacity ($C^-$), i.e. $C^+/C^-$, is from 0.1 to 1.2.

18 Claims, No Drawings

SECONDARY POWER SOURCE

The present invention relates to a secondary power source having a high upper limit voltage, a large capacity and a high reliability for quick charge and discharge cycles.

As electrodes for a conventional electric double layer capacitor, polarizable electrodes composed mainly of activated carbon are used for both the positive electrode and the negative electrode. The upper limit voltage of an electric double layer capacitor is 1.2 V when an aqueous electrolyte is used, or from 2.5 to 3.3 V when an organic electrolyte is used. The energy of the electric double layer capacitor is proportional to the square of the upper limit voltage. Accordingly, an organic electrolyte having a high upper limit voltage provides a high energy as compared with an aqueous electrolyte. However, even with an electric double layer capacitor employing an organic electrolyte, the energy density is as low as at most 1/10 of a secondary cell such as a lead-acid battery, and further improvement of the energy density is required.

Whereas, JP-A-64-14882 proposes a secondary power source for an upper limit voltage of 3 V, which employs, as a negative electrode, an electrode having lithium ions preliminarily doped in a carbon material having a lattice spacing of [002] face of from 0.338 to 0.356 nm as measured by X-ray diffraction. Further, JP-A-8-107048 proposes a battery which employs, for a negative electrode, a carbon material having lithium ions preliminarily doped by a chemical method or by an electrochemical method in a carbon material capable of doping and undoping lithium ions. Still further, JP-A-9-55342 proposes a secondary power source for an upper limit voltage of 4 V, which has a negative electrode having a carbon material capable of doping and undoping lithium ions supported on a porous current collector which does not form an alloy with lithium. However, these secondary power sources have a problem from the viewpoint of the process for their production which requires preliminary doping of lithium ions in the carbon material for the negative electrode.

Further, a lithium ion secondary cell is available as a power source capable of heavy current charge and discharge other than the electric double layer capacitor. The lithium ion secondary cell has characteristics such that it provides a high voltage and a high capacity as compared with the electric double layer capacitor. However, it has had problems such that the resistance is high, and the useful life due to quick charge and discharge cycles is very short as compared with the electric double layer capacitor.

Under these circumstances, it is an object of the present invention to provide a secondary power source which has quick charge and discharge capability, provides a high upper limit voltage and a high capacity, and has a high energy density and a high charge and discharge cycle reliability.

The present invention provides a secondary power source, which comprises a positive electrode containing activated carbon, a negative electrode containing a carbon material capable of doping and undoping lithium ions, and an organic electrolyte containing a lithium salt, wherein the ratio of the positive electrode capacity ($C^+$) to the negative electrode capacity ($C^-$), i.e. $C^+/C^-$, is from 0.1 to 1.2.

Now, the present invention will be described in detail with reference to the preferred embodiments.

In this specification, a negative electrode assembly is one obtained by bonding and integrating a current collector and a negative electrode containing a carbon material capable of doping and undoping lithium ions (hereinafter referred to as carbon material for the negative electrode). Likewise, a positive electrode assembly is one obtained by bonding and integrating a current collector and the positive electrode. A secondary cell as well as an electric double layer capacitor is a kind of a secondary power source. However, in this specification, a secondary power source of a specific construction wherein the positive electrode contains activated carbon and the negative electrode contains carbon material for the negative electrode, will be referred to simply as a secondary power source.

In the present invention, the positive electrode capacity ($C^+$) is a capacity measured at a current density of 0.25 mA/cm$^2$ within a range of from 4.5 V to electrostatic potential (3 to 3.3 V) applied between a lithium reference electrode and the positive electrode impregnated in the electrolyte. The negative electrode capacity ($C^-$) is a capacity measured at a current density of 0.25 mA/cm$^2$ within a range of from 0.005 V to electrostatic potential (3 to 3.3 V) applied between a lithium reference electrode and the negative electrode impregnated in the electrolyte.

When the secondary power source of the present invention, wherein the positive electrode and the negative electrode are faced each other with a separator interposed therebetween, is charged, anions in the electrolyte are adsorbed on the activated carbon of the positive electrode, and lithium ions in the electrolyte are doped in the carbon material of the negative electrode. In such a case, if $C^+/C^-$ exceeds 1.2, metal lithium is likely to deposit on the negative electrode. On the other hand, if $C^+/C^-$ is less than 0.1, the negative electrode capacity is too large as compared with the positive electrode capacity, whereby charging can not adequately be carried out. In the present invention, $C^+/C^-$ is from 0.1 to 1.2, preferably from 0.5 to 0.8. When $C^+/C^-$ is within a range of from 0.1 to 1.2, the negative electrode potential can be made adequately low at the time of charging, and a change in the lattice spacing of [002] face of the carbon material for the negative electrode is small during the charge and discharge cycles, whereby the negative electrode is less likely to deteriorate.

In the secondary power source of the present invention, each of the positive electrode and the negative electrode is preferably an electrode in a form of a layer formed on a current collector. In such a case, if the thicknesses of the positive electrode and the negative electrode are about the same, as the negative electrode capacity is larger than the positive electrode capacity, the potential of the negative electrode does not become low enough when the secondary power source having such positive and negative electrodes thoroughly impregnated with the electrolyte, is charged, and a secondary power source having a high voltage can not be obtained. Accordingly, in the present invention, it is preferred to adjust the balance of the thicknesses of the positive electrode and the negative electrode, to make the negative electrode thin as compared with the positive electrode, and to adjust $C^+/C^-$ to be within a range of from 0.1 to 1.2.

Specifically, in the case where the positive electrode is composed mainly of activated carbon and contains no lithium transition metal oxide as mentioned hereinafter, the thickness of the negative electrode which faces the positive electrode with a separator interposed therebetween, is preferably from 7 to 60%, more preferably from 10 to 40%, to the thickness of the positive electrode. By adjusting the ratio in the thickness of the negative electrode to the positive electrode to be within such a range, the capacity of the positive electrode and the capacity of the negative electrode can be well balanced, and a secondary power source having a high upper limit voltage can be constituted.

Further, in such a case, the thickness of the positive electrode is preferably from 80 to 250 μm, particularly preferably from 100 to 220 μm. If it is less than 80 μm, the capacity of the secondary power source can not be made large. Further, if it exceeds 250 μm, the resistance tends to increase at the time of charging and discharging, whereby quick charging and discharging can not practically be carried out.

On the other hand, the thickness of the negative electrode is preferably from 10 to 150 μm. It is difficult to prepare a negative electrode having a thickness of less than 10 μm. Particularly preferably, the thickness of the positive electrode is from 100 to 200 μm, and the thickness of the negative electrode is from 10 to 50 μm. In the present invention, the positive electrode and the negative electrode may, respectively, be formed on one side or both sides of a current collector. However, the thickness of the positive electrode or the negative electrode represents the thickness of the electrode formed on one side of the current collector, even when it is formed on both sides of the current collector.

With a lithium ion secondary cell, the positive electrode is an electrode composed mainly of a lithium transition metal oxide, and the negative electrode is an electrode composed mainly of a carbon material capable of doping and undoping lithium ions. By charging, lithium ions will be undoped from the lithium transition metal oxide in the positive electrode, and the lithium ions will be doped in the carbon material of the negative electrode. By discharging, lithium ions will be undoped from the negative electrode, and the lithium ions will be doped in the positive electrode. Accordingly, lithium ions in the electrolyte are not substantially involved in the charge and discharge of the cell.

Whereas, with the secondary power source of the present invention, at the time of charging, anions in the electrolyte will be absorbed on the activated carbon in the positive electrode, and lithium ions in the electrolyte will be doped in the carbon material of the negative electrode. At the time of discharging, the lithium ions will be undoped from the negative electrode, and said anions will be desorbed from the positive electrode. Namely, in the secondary power source of the present invention, ions in the electrolyte are substantially involved in the charge and discharge, and the mechanism of the charge and discharge is different from the lithium ion secondary cell. Further, the secondary power source of the present invention is excellent in reliability for charge and discharge cycles as compared with the lithium ion secondary cell wherein lithium ions are doped in and undoped from the component for the positive electrode itself.

With the secondary power source wherein the positive electrode contains activated carbon and the negative electrode contains the carbon material for the negative electrode of the present invention, ions in the electrolyte are involved in the charge and discharge. Accordingly, if the concentration of a lithium salt in the electrolyte is low, there is a possibility that an adequate charging can not be carried out. Therefore, the concentration of a lithium salt in the electrolyte is preferably from 0.5 to 2.0 mol/L, more preferably from 0.75 to 1.5 mol/L.

With the secondary power source of the present invention, efficiency for doping and undoping of lithium ions by the carbon material of the negative electrode is not necessarily 100% during initial charging and discharging. For example, doped lithium ions may not be undoped from the carbon material in some cases. In such a case, the concentration of lithium ions in the electrolyte will decrease, and it is preferred to supplement lithium ions by incorporating a lithium transition metal oxide to the positive electrode.

In such a case, the amount of the lithium transition metal oxide in the positive electrode is preferably from 0.1 to 20 wt %, particularly preferably from 3 to 15 wt %. If it is less than 0.1 wt %, no substantial effect of incorporating the lithium transition metal oxide in the positive electrode will be obtained. On the other hand, if it exceeds 20 wt %, the volume of the lithium transition metal oxide will be so large that the lithium transition metal oxide tends to play the major role in the electrode reaction, whereby high power which can be achieved by a positive electrode made of activated carbon, will not be obtained. Further, the lithium transition metal oxide is likely to deteriorate due to charge and discharge cycles, whereby reliability of the secondary power source tends to be low.

The lithium transition metal oxide to be contained in the positive electrode, is preferably a compound oxide of lithium and at least one transition metal selected from the group consisting of V, Mn, Fe, Co, Ni, Zn and W. Particularly preferred is a compound oxide of lithium and at least one member selected from the group consisting of Mn, Co and Ni. More preferred is $Li_xCo_yNi_{1-y}O_2$ or $Li_zMn_2O_4$, wherein $0<x<2$, $0 \leq y \leq 1$ and $0<z<2$.

In the present invention, the activated carbon contained in the positive electrode has a specific surface area of preferably from 800 to 3,000 m²/g. The starting material and the activation conditions for the activated carbon are not particularly limited. For example, the starting material may be a coconut shell, a phenol resin or a petroleum coke, and the activation method may, for example, be a steam-activation method or a molten alkali activation method. In the present invention, steam-activated coconut shell type activated carbon or a steam-activated phenol resin type activated carbon is particularly preferred. In order to reduce the resistance of the positive electrode, it is preferred to incorporate conductive carbon black or graphite as a conductive material to the positive electrode. In such a case, the conductive material is preferably from 0.1 to 20 wt % in the positive electrode.

As a method for preparing the positive electrode assembly, a method may, for example, be mentioned wherein polytetrafluoroethylene is mixed and kneaded, as a binder, to an activated carbon powder, followed by forming into a sheet shape to obtain a positive electrode, which is then bonded to a current collector by means of a conductive adhesive. Otherwise, an activated carbon powder and a lithium transition metal oxide powder may be dispersed in a varnish having polyvinylidene fluoride, polyamideimide or polyimide dissolved as a binder, and the dispersion may be coated on a current collector by e.g. a doctor blade method, followed by drying. The amount of the binder contained in the positive electrode is preferably from 1 to 20 wt % from the viewpoint of the balance between the strength of the positive electrode assembly and the properties such as the capacity.

In the present invention, the carbon material for the negative electrode preferably has a lattice spacing of [002] face of from 0.335 to 0.410 nm as measured by X-ray diffraction. The carbon material having a lattice spacing exceeding 0.410 nm, tends to deteriorate in the charge and discharge cycles. Specific examples of the carbon material for the negative electrode include a material obtained by heat treating a meso phase pitch-type carbon material or a gas-phase grown carbon fibers at a temperature of from 800 to 3,000° C., petroleum coke, natural graphite, artificial graphite and a hard (non graphitizable) carbon material. In the present invention, any one of such materials may be preferably employed. Among these, natural graphite having a lattice spacing of [002] face of from 0.335 to 0.337 nm, or a carbon material obtained by heat treating an easily graphitizable carbon material at a temperature of at least 2,800° C., is particularly preferred, as the potential for doping and undoping lithium ions is low.

In the case of using a carbon material obtained by heat treatment of e.g. petroleum coke at a low temperature of from about 700 to about 1,200° C. or a hard carbon material, it is preferred to use it in admixture with a graphite type carbon material such as a material obtained by graphitizing e.g. a gas phase grown carbon, whereby the resistance can be reduced. In such a case, the weight ratio of the carbon material obtained by heat treatment of e.g. petroleum coke at a low temperature or the hard carbon material to the graphite type carbon material is preferably from 95:5 to 70:30. If the graphite type carbon material is less than 5 wt %, no adequate effect for reducing the resistance can be obtained, and if it exceeds 30 wt %, the capacity of the negative electrode tends to be low.

The negative electrode assembly in the present invention can be prepared in such a manner that polytetrafluoroethylene is mixed and kneaded as a binder with a carbon material for the negative electrode, in the same manner as for the positive electrode, followed by forming into a sheet shape to obtain a negative electrode, which is then bonded to a current collector by means of a conductive adhesive. Otherwise, a method may be employed wherein polyvinylidene fluoride, polyamideimide or polyimide is used as a binder, the above-mentioned carbon material is dispersed in a solution having the resin for the binder or its precursor dissolved in an organic solvent, and the dispersion is coated on the current collector, followed by drying. These methods are both preferred.

In the method for coating the negative electrode layer on the current collector to obtain the negative electrode assembly, the solvent for dissolving the resin for the binder or its precursor, is not particularly limited. However, N-methyl-2-pyrrolidone (hereinafter referred to as NMP) is preferred, since it is readily available and capable of readily dissolving the resin constituting the binder or its precursor. Here, the precursor for polyamideimide or the precursor for polyimide means one which will be converted to polyamideimide or polyimide, respectively, by polymerization under heating.

The binder obtained as described above will be cured by heating and is excellent in the chemical resistance, the mechanical properties and the dimensional stability. The temperature for the heat treatment is preferably at least 200° C. At a temperature of at least 200° C., even the precursor for polyamideimide or the precursor for polyimide will usually be polymerized to form polyamideimide or polyimide, respectively. The atmosphere for the heat treatment is preferably an inert atmosphere of e.g. nitrogen or argon or under a reduced pressure of at most 1 torr. The polyamideimide or the polyimide is resistant to the organic electrolyte to be used in the present invention and also has adequate resistance against heating at a high temperature at a level of 300° C. to remove moisture from the negative electrode or against heating under reduced pressure.

In the present invention, an adhesive layer made of polyamideimide or polyimide may be interposed between the negative electrode and the current collector to further increase the bond strength between the negative electrode and the current collector. In such a case, a varnish having polyamideimide, polyimide or a precursor thereof dissolved in a solvent, may preliminarily be coated on the current collector by e.g. a doctor blade method and dried to form an adhesive layer, and a negative electrode may be formed on the adhesive layer. Further, it is preferred to have a conductive material such as copper or graphite dispersed in the varnish to form the adhesive layer, since it is thereby possible to reduce the contact resistance between the negative electrode and the current collector. The varnish containing such a conductive material may also be used as a conductive adhesive interposed between the positive electrode and the current collector in a case where the positive electrode is formed into a sheet shape.

The lithium salt contained in the organic electrolyte in the present invention is preferably at least one member selected from the group consisting of $LiPF_6$, $LiBF_4$, $LiClO_4$, $LiN(SO_2CF_3)_2$, $CF_3SO_3Li$, $LiC(SO_2CF_3)_3$, $LiAsF_6$ and $LiSbF_6$. The solvent preferably contains at least one member selected from the group consisting of ethylene carbonate, propylene carbonate, butylene carbonate, dimethyl carbonate, ethylmethyl carbonate, diethyl carbonate, sulfolane and dimethoxyethane. An electrolyte comprising such a lithium salt and a solvent has a high upper limit voltage and a high electrical conductivity.

Among the above-mentioned solvents, in view of stability to the activated carbon, a solvent containing propylene carbonate is particularly preferred, and propylene carbonate is contained in the solvent for the electrolyte in an amount of preferably at least 50 wt %. However, if a solvent containing at least 50 wt % of propylene carbonate is employed as a solvent for the electrolyte, and graphite type carbon is employed for the carbon material for the negative electrode, as propylene carbonate is likely to decompose at the time of charging, lithium ions can not be doped in the carbon material for the negative electrode. In the case of such a combination, it is preferred to add a crown ether to the electrolyte, as the decomposition of propylene carbonate is suppressed, whereby lithium ions can be doped in the graphite type carbon.

In such a case, the crown ether is contained preferably in an amount of from 0.1 to 10 wt % in the electrolyte. If it is less than 0.1 wt %, no adequate effect for adding the crown ether can be obtained, and if it exceeds 10 wt %, the positive electrode will significantly deteriorate. Among the crown ethers, 12-crown-4 is particularly preferred.

The particularly preferred electrolyte in the present invention is a propylene carbonate solution containing $LiBF_4$ stable to the activated carbon of the positive electrode. When this electrolyte is used, an excellent charge and discharge cycle property and an excellent voltage application property can be obtained.

Now, the present invention will be described in further detail with reference to Examples (Examples 1 to 7 and Examples 10 to 12) and Comparative Examples (Examples 8, 9 and 13). However, it should be understood that the present invention is by no means restricted by such Examples.

The preparations of secondary power sources and the measurements in Examples 1 to 9 were carried out in an argon glove box with a dew point of at most −60° C. in all cases.

EXAMPLE 1

A mixture comprising 80 wt % of activated carbon having a specific surface area of 2,000 $m^2/g$ obtained by steam-activation using a phenol resin as the starting material, 10 wt % of conductive carbon black and 10 wt % of polytetrafluoroethylene as a binder, was added to ethanol, followed by kneading, rolling and drying in vacuum at 200° C. for 2 hours to obtain an electrode sheet having a thickness of 150

μm. An electrode in a rectangular shape of 6 cm×4 cm was obtained from the electrode sheet, and was bonded to an aluminum foil by means of a conductive adhesive using polyamideimide as a binder, followed by heat treatment at 300° C. for 2 hours under reduced pressure, to obtain a positive electrode assembly.

As the electrolyte, a solution having 1 mol/L of $LiBF_4$ dissolved in a mixed solvent of ethylene carbonate and diethyl carbonate with a volume ratio of 1:1 was used. The positive electrode capacity measured at a current density of 0.25 mA/cm$^2$ within a voltage range of from electrostatic potential (3.2 V) to 4.5 V to the lithium reference electrode in this electrolyte, was 5.13 mAh.

Then, as a carbon material capable of doping and undoping lithium ions, graphitized meso carbon micro beads manufactured by Osaka Gas Co., Ltd., having a lattice spacing of [002] face of 0.336 nm as measured by X-ray diffraction, were dispersed in a solution having a polyamideimide resin dissolved in N-methylpyrrolidone, and the dispersion was coated on a current collector made of copper followed by drying, to obtain a negative electrode assembly. The weight ratio of the carbon material to the polyamideimide resin in the negative electrode was 9:1. The negative electrode assembly was further pressed by a roll pressing machine. The obtained negative electrode was in a rectangular shape of 6 cm×4 cm, had a thickness of 30 μm, and had a capacity of 15.2 mAh as measured at a current density of 0.25 mA/cm$^2$ within a voltage range of from 0.005 V to electrostatic potential (3.2 V) to the lithium reference electrode in the electrolyte. Accordingly, $C^+/C^-$ was 0.338.

The positive electrode assembly and the negative electrode assembly thus obtained were disposed to face each other with a polypropylene separator interposed therebetween, and were thoroughly impregnated with the electrolyte, to obtain a secondary power source, whereupon the initial capacity was measured. Thereafter, a charge and discharge cycle test was carried out at a charge and discharge current of 240 mA within a range of from 4.2 V to 2.75 V, and the capacity after 2,000 cycles was measured, whereupon the change in capacity was calculated. The results are shown in Table 1.

EXAMPLE 2

A negative electrode assembly having a negative electrode thickness of 20 μm and a negative electrode capacity of 9.33 mAh was prepared in the same manner as in Example 1 except that the amount of the dispersion of graphitized meso carbon micro beads to be coated on the negative electrode current collector was changed. A secondary power source was prepared in the same manner as in Example 1 except that this negative electrode assembly was employed. $C^+/C^-$ was 0.549. The secondary power source was evaluated in the same manner as in Example 1. The results are shown in Table 1.

EXAMPLE 3

A negative electrode assembly having a negative electrode thickness of 15 μm and a negative electrode capacity of 6.86 mAh was prepared in the same manner as in Example 1 except that the amount of the dispersion of graphitized meso carbon micro beads to be coated on the negative electrode current collector was changed. A secondary power source was prepared in the same manner as in Example 1 except that this negative electrode assembly was employed. $C^+/C^-$ was 0.748. The secondary power source was evaluated in the same manner as in Example 1. The results are shown in Table 1.

EXAMPLE 4

A positive electrode assembly having a positive electrode thickness of 150 μm was prepared in the same manner as in Example 1, except that a mixture comprising 75 wt % of activated carbon, 5 wt % of $LiCoO_2$, 10 wt % of conductive carbon black and 10 wt % of polytetrafluoroethylene was used instead of the mixture comprising 80 wt % of activated carbon, 10 wt % of conductive carbon black and 10 wt % of polytetrafluoroethylene. The positive electrode capacity was measured in the same manner as in Example 1, whereupon it was 6.20 mAh.

A secondary power source was prepared in the same manner as in Example 1 except that this positive electrode assembly was employed. $C^+/C^-$ was 0.665. The secondary power source was evaluated in the same manner as in Example 1. The results are shown in Table 1.

EXAMPLE 5

A positive electrode assembly having a positive electrode thickness of 150 μm was prepared in the same manner as in Example 1, except that a mixture comprising 70 wt % of activated carbon, 10 wt % of $LiCoO_2$, 10 wt % of conductive carbon black and 10 wt % of polytetrafluoroethylene was used instead of the mixture comprising 80 wt % of activated carbon, 10 wt % of conductive carbon black and 10 wt % of polytetrafluoroethylene. The positive electrode capacity was measured in the same manner as in Example 1, whereupon it was 7.27 mAh.

A secondary power source was prepared in the same manner as in Example 1 except that this positive electrode assembly was employed. $C^+/C^-$ was 0.779. The secondary power source was evaluated in the same manner as in Example 1. The results are shown in Table 1.

EXAMPLE 6

Non graphitizable carbon having a lattice spacing of [002] face of 0.376 nm as measured by X-ray diffraction and a powder obtained by graphitizing gas phase grown carbon at 3,000° C., were dispersed in a solution having a polyamideimide resin dissolved in NMP, and the dispersion was coated on a current collector made of copper followed by drying to obtain a negative electrode assembly. The negative electrode assembly was further pressed by a roll pressing machine. The weight ratio of the non graphitizable carbon, the powder obtained by graphitizing gas phase grown carbon and the polyamideimide resin was 8:1:1. The obtained negative electrode had a thickness of 18 μm, was in a rectangular shape of 6 cm×4 cm, and had a capacity of 7.75 mAh as measured in the same manner as in Example 1.

A secondary power source was prepared in the same manner as in Example 1 except that this negative electrode assembly was employed. $C^+/C^-$ was 0.662. The secondary power source was evaluated in the same manner as in Example 1. The results are shown in Table 1.

EXAMPLE 7

As the electrolyte, a solution prepared by adding 2 wt % of 12-crown-4 to a propylene carbonate solution containing 1 mol/L of $LiBF_4$, was employed. A positive electrode assembly and a negative electrode assembly were prepared in the same manner as in Example 1, and the respective capacities were measured in the above-mentioned electrolyte, whereby the positive electrode capacity was 5.13 mAh, and the negative electrode capacity was 6.86 mAh. Accordingly, $C^+/C^-$ was 0.748. A secondary power source was prepared in the same manner as in Example 1 except that the above-mentioned positive electrode assembly, the above-mentioned negative electrode assembly and the above-mentioned electrolyte were employed. The secondary power source was evaluated in the same manner as in Example 1. The results are shown in Table 1.

EXAMPLE 8

A positive electrode assembly having a positive electrode thickness of 100 μm and a positive electrode capacity of 3.02 mAh was prepared in the same manner as in Example 1 except that the thickness of the positive electrode was changed. Further, a negative electrode assembly having a thickness of the negative electrode of 80 μm and a negative electrode capacity of 40.3 mAh was prepared in the same manner as in Example 1 except that the amount of the dispersion of graphitized meso carbon micro beads to be coated on the negative electrode current collector was changed. Accordingly, $C^+/C^-$ was 0.075. A secondary power source was prepared in the same manner as in Example 1 except that the above-mentioned positive electrode assembly and the above-mentioned negative electrode assembly were employed. The secondary power source was evaluated in the same manner as in Example 1. The results are shown in Table 1.

EXAMPLE 9

The positive electrode assembly having a positive electrode thickness of 200 μm and a positive electrode capacity of 7.24 mAh was prepared in the same manner as in Example 1 except that the thickness of the positive electrode was changed. Further, a negative electrode assembly having a negative electrode thickness of 10 μm and a negative electrode capacity of 5.56 mAh was prepared in the same manner as in Example 1 except that the amount of the dispersion of graphitized meso carbon micro beads to be coated on the negative electrode current collector was changed. Accordingly, $C^+/C^-$ was 1.30. A secondary power source was prepared in the same manner as in Example 1 except that the above-mentioned positive electrode assembly and the above-mentioned negative electrode assembly were employed. The secondary power source was evaluated in the same manner as in Example 1. The results are shown in Table 1.

TABLE 1

|  | Initial capacity (mAh) | Change in capacity (%) |
| --- | --- | --- |
| Example 1 | 4.25 | −10.2 |
| Example 2 | 4.27 | −9.5 |
| Example 3 | 4.26 | −8.4 |
| Example 4 | 4.51 | −9.5 |
| Example 5 | 4.63 | −9.4 |
| Example 6 | 4.02 | −9.6 |
| Example 7 | 4.15 | −8.3 |
| Example 8 | 3.11 | −20.6 |
| Example 9 | 4.02 | −36.4 |

EXAMPLE 10

A petroleum coke base carbon material was heat-treated at a temperature of 1,000° C. to obtain a carbon material capable of doping and undoping lithium ions. The lattice spacing of [002] face of this carbon material was 0.341 nm as measured by X-ray diffraction. The carbon material capable of doping and undoping lithium ions and a material obtained by graphitizing gas phase grown carbon at 3,000° C. were dispersed in a solution having polyvinylidene fluoride dissolved in NMP, and the dispersion was coated on a current collector made of copper followed by drying to obtain a negative electrode assembly. The weight ratio of the carbon material capable of doping and undoping lithium ions, the material obtained by graphitizing gas phase grown carbon and polyvinylidene fluoride in the negative electrode, was 8:1:1. The negative electrode assembly was further pressed by a roll pressing machine. The obtained negative electrode was in a rectangular shape of 6 cm×4 cm, had a thickness of 15 μm, and had a negative electrode capacity of 7.02 mAh.

The positive electrode assembly obtained in Example 1 and the above-mentioned negative electrode assembly were disposed to face each other with a polypropylene separator interposed therebetween, and were thoroughly impregnated with a propylene carbonate solution having 1 mol/L of $LiBF_4$ to obtain a secondary power source. $C^+/C^-$ was 0.731. The initial capacity of the secondary power source was measured, a charge and discharge cycle test was carried out at a charge and discharge current of 240 mA within a range of from 4.2 V to 3 V, and the capacity after 1,000 cycles was measured, whereby the change in capacity was calculated. The results are shown in Table 2.

EXAMPLE 11

A positive electrode assembly having a thickness of 150 μm and a positive electrode capacity of 4.51 mAh was prepared in the same manner as in Example 1 except that coconut shell was employed as a material for activated carbon in the positive electrode instead of the phenol resin. A secondary power source having $C^+/C^-$ of 0.642 was prepared in the same manner as in Example 10 except that this positive electrode assembly was employed. Measurements were carried out in the same manner as in Example 10. The results are shown in Table 2.

EXAMPLE 12

A negative electrode assembly having a negative electrode thickness of 15 μm and a negative electrode capacity of 6.51 mAh was prepared in the same manner as in Example 10, except that a mixture comprising polyvinylidene fluoride and polyamideimide with a weight ratio of 1:1 was employed as a binder for the negative electrode, and the composition of the negative electrode was adjusted so that the weight ratio of the carbon material capable of doping and undoping lithium ions used in Example 10, the material obtained by graphitizing gas phase grown carbon and the binder, was 7:1:1. A secondary power source having $C^+/C^-$ of 0.788 was prepared in the same manner as in Example 10 except that this negative electrode assembly was employed. Measurements were carried out in the same manner as in Example 10. The results are shown in Table 2.

EXAMPLE 13

A secondary power source having a positive electrode capacity of 10.01 mAh, a negative electrode capacity of 90.5 mAh and $C^+/C^-$ of 0.112 was prepared in the same manner as in Example 10 except that the thickness of the positive electrode was 300 μm and the thickness of the negative electrode was 200 μm. Measurements were carried out in the same manner as in Example 10. The results are shown in Table 2.

TABLE 2

|  | Initial capacity (F) | Change in capacity (%) |
| --- | --- | --- |
| Example 10 | 19.2 | −8.9 |
| Example 11 | 17.9 | −9.2 |
| Example 12 | 19.9 | −7.1 |
| Example 13 | 18.5 | −21.5 |

The secondary power sources obtained in Examples are excellent in charge and discharge cycle durability within a voltage range of as high as from 4.2 V to 2.75 V, and have large capacities.

Namely, according to the present invention, a secondary power source having a high upper limit voltage, a large capacity and a high reliability for charge and discharge cycles, can be provided.

What is claimed is:

1. A secondary power source, which comprises
   a positive electrode containing activated carbon,
   a negative electrode containing a carbon material capable of doping and undoping lithium ions, and
   an organic electrolyte containing a lithium salt, wherein
   a ratio of the positive electrode capacity ($C^+$) to the negative electrode capacity ($C^-$), i.e. $C^+/C^-$, is from 0.1 to 1.2,
   the positive electrode has a thickness of from 100 to 200 μm, and
   the negative electrode has a thickness of from 10 to 50 μm.

2. The secondary power source according to claim 1, wherein each of the positive electrode and the negative electrode is an electrode in a form of a layer formed on a current collector, and a thickness of the negative electrode is from 7 to 60% of a thickness of the positive electrode.

3. The secondary power source according to claim 1, wherein the carbon material has a lattice spacing of [002] face of from 0.335 to 0.410 nm.

4. The secondary power source according to claim 3, wherein the carbon material is natural graphite having a lattice spacing of [002] face of from 0.335 to 0.337 nm, or a carbon material obtained by subjecting a carbon material which is easily graphitized to heat treatment at a temperature of at least 2,800° C.

5. The secondary power source according to claim 1, wherein the solvent of the organic electrolyte comprises at least one member selected from the group consisting of ethylene carbonate, propylene carbonate, butylene carbonate, dimethyl carbonate, ethylmethyl carbonate, diethyl carbonate, sulfolane and dimethoxyethane.

6. The secondary power source according to claim 1, wherein the organic electrolyte contains at least 50 wt % of propylene carbonate and from 0.1 to 10 wt % of a crown ether.

7. The secondary power source according to claim 1, wherein the activated carbon of the positive electrode has a specific surface area of from 800 to 3,000 m²/g.

8. The secondary power source according to claims 7, wherein the activated carbon of the positive electrode is steam-activated coconut shell type activated carbon or steam-activated phenol resin type activated carbon.

9. The secondary power source according to claim 1, wherein the positive electrode contains from 0.1 to 20 wt % of a conductive material.

10. The secondary power source according to claim 1, wherein the positive electrode contains a lithium transition metal oxide in an amount of from 0.1 to 20 wt %.

11. The secondary power source according to claim 10, wherein the lithium transition metal oxide is a compound of lithium and at least one member selected from the group consisting of V, Mn, Fe, Co, Ni, Zn and W.

12. The secondary power source according to claim 10, wherein the lithium transition metal oxide is $Li_xCo_yNi_{1-y}O_2$ or $Li_zMn_2O_4$, wherein $0<x<2$, $0\leq y\leq 1$ and $0<z<2$.

13. The secondary power source according to claim 1, wherein $C^+/C^-$ is from 0.5 to 0.8.

14. A method of making a secondary power source, the method comprising
   bonding a positive electrode containing activated carbon to a current collector to form a positive electrode assembly; and
   combining the positive electrode assembly with a negative electrode assembly to form the secondary power source of claim 1.

15. A secondary power source, which comprises
   a positive electrode containing activated carbon,
   a negative electrode containing a carbon material capable of doping and undoping lithium ions, and
   an organic electrolyte containing a lithium salt, wherein
   a ratio of the positive electrode capacity ($C^+$) to the negative electrode capacity ($C^-$), i.e. $C^+/C^-$, is from 0.1 to 1.2, and
   the positive electrode contains a lithium transition metal oxide in an amount of from 0.1 to 20 wt %.

16. The secondary power source according to claim 15, wherein the lithium transition metal oxide is a compound oxide of lithium and at least one member selected from the group consisting of V, Mn, Fe, Co, Ni, Zn and W.

17. The secondary power source according to claim 15, wherein the lithium transition metal oxide is $Li_xCo_yNi_{1-y}O_2$ or $Li_zMn_2O_4$, wherein $0<x<2$, $0<y<1$ and $0\leq z\leq 2$.

18. A method of making a secondary power source, the method comprising
   bonding a positive electrode containing activated carbon to a current collector to form a positive electrode assembly; and
   combining the positive electrode assembly with a negative electrode assembly to form the secondary power source of claim 15.

* * * * *